United States Patent

Yamasaki

[19]

[11] Patent Number: 5,935,358
[45] Date of Patent: Aug. 10, 1999

[54] METHOD OF PRODUCING A LAMINATE CERAMIC CAPACITOR

[75] Inventor: Akio Yamasaki, Osaka, Japan

[73] Assignee: New Create Corporation, Osaka, Japan

[21] Appl. No.: 09/061,261

[22] Filed: Apr. 17, 1998

[51] Int. Cl.[6] .................................................. C04B 37/00
[52] U.S. Cl. ............................. 156/89.12; 156/89.14; 264/615; 264/618; 427/96; 29/25.03; 29/851
[58] Field of Search ..................................... 264/614, 618, 264/615; 156/89.12, 89.14; 427/96; 29/25.03, 851

[56] References Cited

U.S. PATENT DOCUMENTS

| | | |
|---|---|---|
| 3,697,817 | 10/1972 | Yongue . |
| 5,176,773 | 1/1993 | Thompson ............................ 156/89.12 |
| 5,650,199 | 7/1997 | Chang ........................................ 427/97 |
| 5,716,481 | 2/1998 | Kobayashi ............................ 264/176.1 |

FOREIGN PATENT DOCUMENTS

| | | |
|---|---|---|
| 7-54779 | 5/1988 | Japan . |
| 7-1428 | 1/1995 | Japan . |
| 8-167544 | 6/1996 | Japan . |

*Primary Examiner*—James Derrington
*Attorney, Agent, or Firm*—Armstrong, Westerman, Hattori, McLeland & Naughton

[57] ABSTRACT

The method of producing a ceramic sheet for laminated ceramic electronic devices according to the present invention comprises printing an electrically conductive composition imagewise on one side of a carrier film F either directly or indirectly through a green ceramic layer G' by the screen printing technique to form electrodes E and then printing a green ceramic composition in solid on top of the printed surface by the screen printing technique to form a green ceramic layer G.

2 Claims, 7 Drawing Sheets

METHOD OF PRODUCING A LAMINATE CERAMIC CAPACITOR

TECHNICAL FIELD

The present invention relates to a technology for producing ceramic sheets useful for the fabrication of laminated ceramic electronic devices which is advantageous in terms of process control and equipment cost and conducive to upgrading of products.

PRIOR ART

Technology 1

A representative known process for the production of a laminated ceramic capacitor comprises coating a green ceramic composition on a carrier film using a coater, drying the coat, and printing an electrically conductive electrode pattern, inclusive of lamination positioning marks and cut-line marks, by the screen printing technique. The objective laminated ceramic capacitor can be fabricated by cutting the sheet to size, releasing the carrier film from the ceramic sheet, laminating a plurality of such ceramic sheets for integration, cutting the integral sheet into individual chips, and subjecting the chips to sintering and other treatments.

For example, Japanese Patent Publication H7-54779 (Kokai Tokkyo Koho S63-102216) states, describing the prior art preceding its application, that a laminated ceramic capacitor is generally manufactured by coating a ceramic slurry in a uniform thickness on a carrier film by means of a doctor knife or a suitable other coating technique, drying the coat, printing an internal electrode pattern on the surface of this green ceramic sheet by using a screen printing machine, drying the pattern, releasing the green ceramic sheet from the carrier film, transferring it onto a platform, cutting it to size there, stacking up a predetermined number of such ceramic sheets one on another and compressing them together, cutting the resultant laminate to the size of individual capacitors, sintering the cuttings and finally coating a silver paste electrode on the edge of the respective cuttings and baking the paste. This publication further describes an alternative process in which the green ceramic sheets released and cut as mentioned above are respectively printed with the internal electrode pattern, then dried and laminated. The above patent literature discloses, as its own innovation, a process which comprises forming a green ceramic sheet on a carrier film, transferring the ceramic sheet and carrier film as a unit onto a platform and selectively cutting the green sheet only (half-cutting).

Japanese Kokai Tokkyo Koho H7-1428 discloses a process which comprises coating a ceramic slurry composed of a ceramic powder, a resin, and a solvent on a first surface of a continuous ribbon of carrier film, drying the coat to provide a ceramic sheet, and printing an internal electrode pattern on the ceramic sheet. After this sheet is cut to size, the carrier film is released and a plurality of such ceramic sheets are laminated by pressing under heating to provide a laminate for use as a ceramic device such as a laminated ceramic capacitor or a laminated ceramic varistor.

Technology 2

Another known technology for the production of a laminated ceramic capacitor comprises printing an electrode pattern on a carrier film by the screen printing technique, drying the print, coating a green ceramic composition thereon using a coater, and drying the coat. A laminated ceramic capacitor can then be obtained by cutting the above sheet to size, releasing the carrier film, laminating a plurality of such sheets, cutting the laminate to chip size, and sintering and otherwise treating them in a suitable sequence.

Technology 3

Lying intermediate between the above technology 1 and technology 2 is the technology disclosed in Japanese Kokai Tokkyo Koho H8-167544 which comprises coating a ceramic slurry on a carrier film, drying the coat to give a ceramic sheet, printing an electrode pattern on the ceramic sheet, repeating the above steps in a sequence, and laminating a plurality of the ceramic sheets to provide the objective laminate.

In technologies 1 and 2, it is mandatory to use a coater for depositing a green ceramic composition uniformly on a carrier film (or a carrier film printed with an electrode pattern) in order to fabricate a ceramic sheet. However, the interposition of a coater in a laminated ceramic capacitor production line is a major drawback in terms of equipment cost and process control.

In addition, the formation of a ceramic sheet with a coater has the following disadvantage from quality points of view. Thus, when a green ceramic composition is coated on a carrier film by means of a coater and the electrode pattern is then printed, the thickness of the electrode pattern creates steps detracting from the surface levelness of the ceramic sheet. When the electrode pattern is first printed on a carrier film and the green ceramic composition is then coated with a coater, the background regions between the electrodes are not sufficiently filled up with the green ceramic composition and the surface of the green ceramic layer thus constructed is locally recessed in correspondence with said background regions to detract from the surface flatness. The thinner the green ceramic layer is, the greater is the unevenness of the laminate. Therefore, it is essential to institute a countermeasure for this drawback particularly today as the more and more reduction in thickness of ceramic sheets is required. When the ceramic sheet has said steps or recesses, air spaces tend to form upon lamination and the sintered product will contain voids. In order to cancel the surface irregularity and eliminate chances for void formation on lamination, a special measure such as increasing the pressing force, for instance, must be taken but such a measure is industrially disadvantageous and, even if such measures are taken, it is impossible to assure complete reliability of the product.

According to technology 3, the steps between the electrode pattern and the remaining area can be decreased but the absolute decrease is of the order that the step of 2 $\mu$m per electrode is only decreased to 1.5 $\mu$m at best. Thus, the technology offers no radical solution to the problem. Moreover, the disadvantages of increased equipment cost and complicated process control due to interposition of the coater remains yet to be obviated.

In the above state of the art, the present invention has for its object to provide an improved production technology which does not require a coater, which imposes a burden on equipment cost and process control, and yet capable of providing ceramic sheets having high surface flatness on both sides regardless of their thickness and, when laminated under pressure for the fabrication of a laminated ceramic electronic device, giving rise to no interlayer gaps.

SUMMARY OF THE INVENTION

The method of producing a ceramic sheet for laminated ceramic electronic devices according to the present invention comprises printing an electrically conductive composition imagewise on one side of a carrier film F either directly or indirectly through a green ceramic layer G' by the screen printing technique to form electrodes E and then printing a green ceramic composition in solid on top of the printed surface by the screen printing technique to form a green ceramic layer G.

DETAILED DESCRIPTION OF THE PREFERRED EMBODIMENTS OF THE INVENTION

Figure 1:
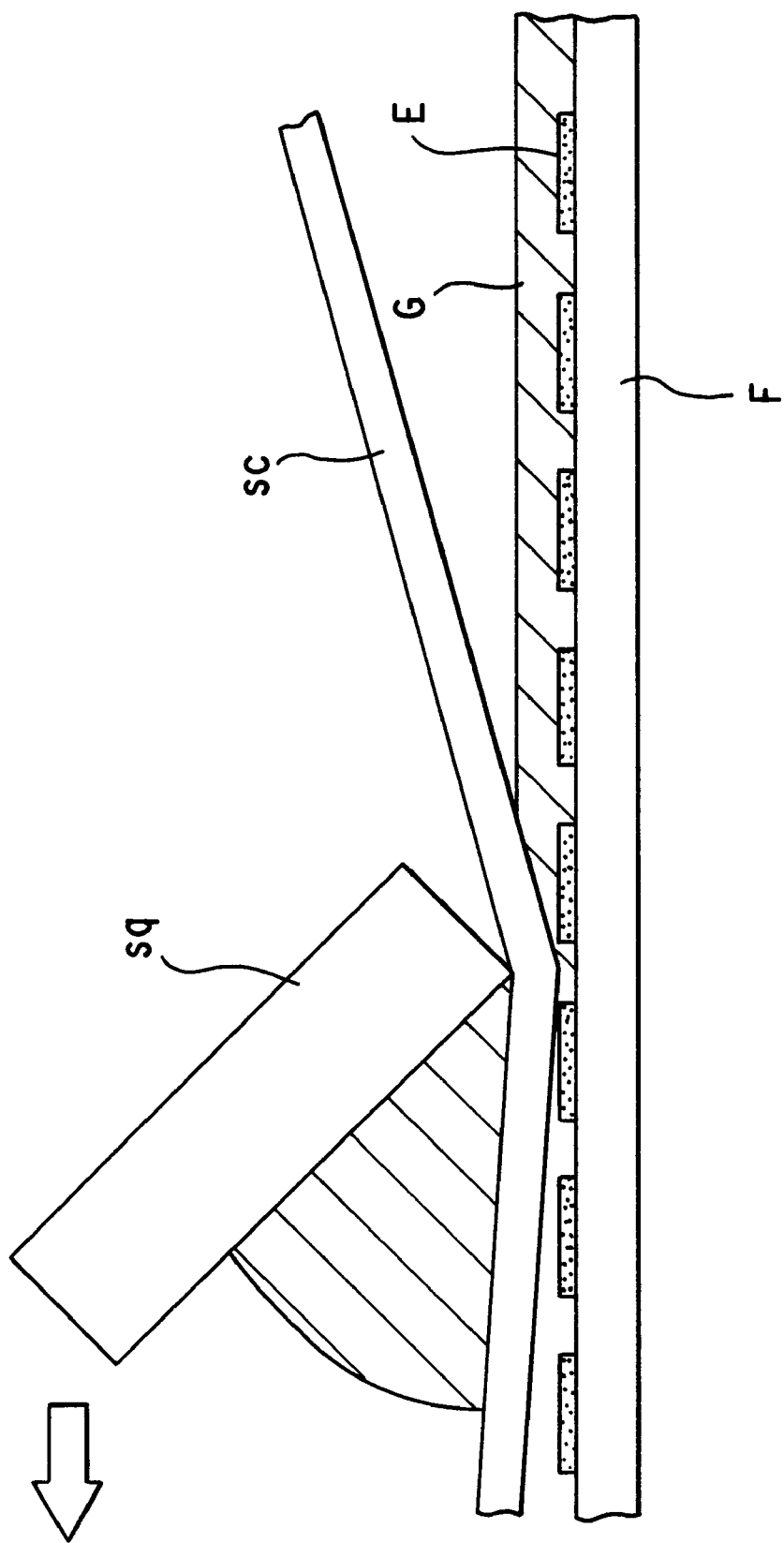
FIG. 1 is a schematic view showing the formation of a green ceramic layer G on the electrodes E formed on carrier film F.

The present invention is now described in detail.

In accordance with the present invention, an electrically conductive composition is printed imagewise, i.e. in a predetermined pattern, on one side of a carrier film F by the screen printing technique to form electrodes E. In this screen printing, lamination positioning marks and cutline marks are simultaneously printed. The electrodes E become internal electrodes upon fabrication of a laminated ceramic electronic device such as a ceramic capacitor.

The carrier film F which can be used includes but is not limited to biaxially oriented polyester films [e.g. biaxially oriented poly(ethylene terephthalate) film, biaxially oriented poly(butylene terephthalate) film, biaxially oriented poly(ethylene naphthalate) film, biaxially oriented poly(butylene naphthalate) film, etc.] and biaxially oriented polypropylene film. When the cost, physical and surface properties, etc. of a carrier film are globally taken into consideration, biaxially oriented poly(ethylene terephthalate) film, which is commonly referred to briefly as PET film, and biaxially oriented polypropylene film are preferred.

To facilitate the subsequent release of the ceramic sheet, it is generally recommendable to subject the upper surface of the carrier film F to pretreatment with a parting agent.

The electrically conductive composition which can be used for the formation of electrodes E includes a variety of pastes prepared by mixing a metal powder, such as silver or nickel powder, uniformly with a binder and a solvent. After printing with the conductive composition, the volatile fraction is thoroughly removed by drying to form electrodes E.

The electrode E is rectangular in many instances. The thickness of electrodes E may for example be about 0.5 to 5 $\mu$m before sintering.

When a conductive composition is directly printed in a pattern (inclusive of lamination positioning marks and cutline marks) on one side of a carrier film F by the screen printing technique, the pattern of said electrodes E and marks is not necessarily printed accurately depending on the type of conductive composition used and the thickness of electrodes E because the upper surface of the carrier film F has been treated with a parting agent. This problem can be solved by incorporating a small amount of a surfactant (a silicone surfactant or a fluoride surfactant) in the conductive composition or, alternatively, by the procedure which comprises forming a green ceramic layer G' on the upper surface of the carrier film F by solid printing or coating (or providing a carrier film F preformed with such a green ceramic layer G'), super-imposedly printing the pattern of electrodes E etc. using a conductive composition to form electrodes E, and then depositing a green ceramic composition thereon by printing to provide a green ceramic layer G as will be described in detail hereinafter. When a green ceramic layer G' is first formed on one side of the carrier film F, it is advisable to take such a procedure as to print said positioning and cutline marks in such a manner that the green ceramic layer G may have windows in the corresponding positions in order that said marks will not be hidden by the subsequent formation of the green ceramic layer G.

After electrodes E (as well as positioning and cutline marks) are formed directly or indirectly through the green ceramic layer G', the green ceramic composition is then printed in solid by the screen printing technique to form a green ceramic layer G. (In this operation, too, a contrivance is necessary not to hide the positioning marks and cutline marks). By the screen printing method, the regions between electrodes E can also be filled up with the green ceramic composition without leaving voids.

The green ceramic composition is a slurry composed of a ceramic dielectric powder, a resin binder and a solvent. The viscosity of the composition may usually range from 5000 to 25000 cps/25° C. but a higher viscosity or a lower viscosity can be used optionally.

In the screen printing with the green ceramic composition, overlap printing may be made if the necessary thickness cannot be obtained by single printing.

After the printing, the green ceramic composition is dried to provide a green ceramic layer G. The thickness (before sintering) of the green ceramic layer G may for example be 30-2 $\mu$m and is about 20-2 $\mu$m in many instances. The thickness of as small as 10 $\mu$m or less or even 3-2 $\mu$m can be easily attained by the screen printing technique.

The printing and drying of the conductive composition and the printing and drying of the green ceramic composition are preferably carried out in line using a two-color screen printing press equipped with a dryer means. Of course, the same effect can be achieved by passing the substrate twice through a one-color screen printing press.

The ceramic sheet-carrier film which consists of carrier film F/(green ceramic layer G')/electrodes E/green ceramic layer G, thus obtained, is further processed to fabricate a laminated ceramic electronic device (a laminated ceramic capacitor, a laminated ceramic varistor, etc.). The subsequent process may have many variations but a typical production flow is as follows.

The ceramic sheet on carrier film F is cut (half-cut) in the longitudinal direction along both edges and, then, in a transverse direction with a cutter means of a transfer device on a releasing table. Then, the unit square ceramic sheets as attracted under a suction force to the transfer device is carried onto a press table and set in position on the table. This operation is repeated to sequentially superimpose the unit ceramic sheet on the preceding unit ceramic sheet. The superimposed sheets are then laminated by pressing. (In certain cases, a dummy ceramic sheet not printed with electrodes E is laminated as a first layer, a last layer, or in an intermediate layer). This operation of stacking cut ceramic sheets one on another and laminating them is repeated until a laminate made up of a predetermined number of ceramic sheets is obtained and finally this laminate is pressed at a high pressure to provide a completely integral laminate. After this final high-pressure lamination, the laminate is cut to the size of individual chips and sintered in the usual manner. Lastly, the end face of each chip is provided with external electrodes to complete a laminated ceramic capacitor.

The technology of the present invention is now described in comparison with the prior art, reference being had to the accompanying drawings.

FIG. 1 is a schematic view showing the formation of a green ceramic layer G on the electrode E pattern formed on carrier film F. In the view, the symbol sc represents a screen and the symbol sq represents a queezee. When the green ceramic layer is formed by the screen printing technique, the nonprinted regions between electrodes E are also filled with the green ceramic composition without leaving gaps so that a void-free green ceramic layer G can be formed. Regardless of its thickness, the resulting ceramic sheet is superior in flatness on both sides.

Figure 2:
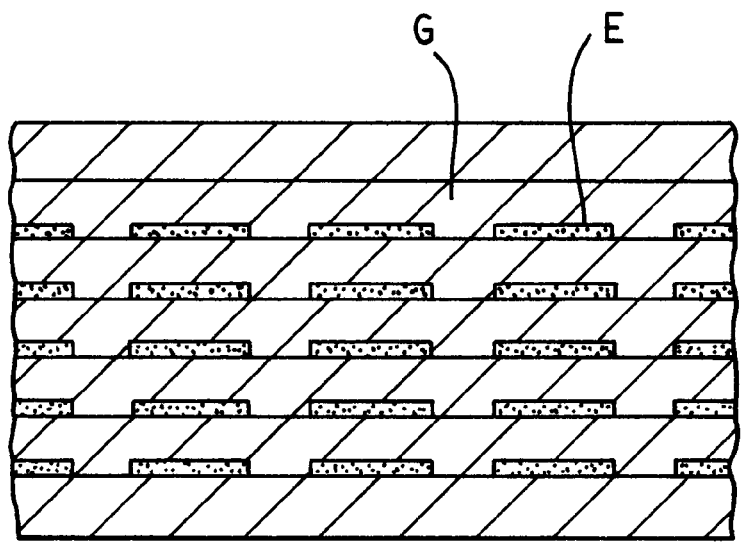
FIG. 2 is a cross-section view of a laminate formed by successive lamination of the ceramic sheets obtained by the technique illustrated in FIG. 1.

FIG. 2 is a cross-section view of the laminate formed by successive lamination of the ceramic sheets obtained by the technique illustrated in FIG. 1. In this lamination process, because the flatness of individual ceramic sheets is high, the sheets can be laminated evenly by the laminating pressure without leaving gaps. Accordingly, after the final lamination is carried out at a high pressure, there is no interlayer gap in the final laminate. When the resulting laminate is cut to the size of individual chips, sintered, and ultimately fabricated into a laminated ceramic electronic device such as a laminated ceramic capacitor, the incidence of rejects is drastically reduced or even made nil. It is not that only the product quality is improved but since the coater-related equipment and process can be omitted, a positive cost reduction can be realized.

Figure 3:
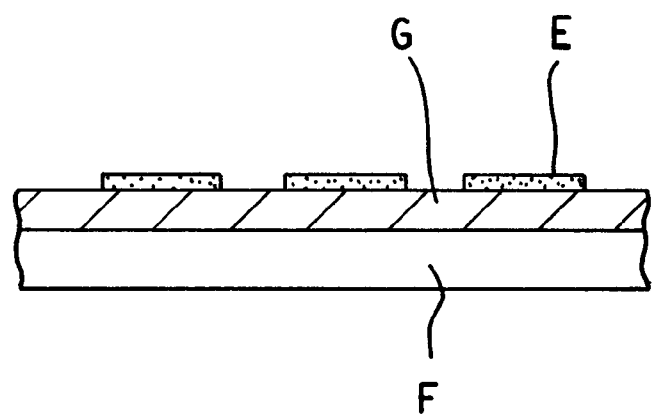
FIG. 3 is a schematic view showing the formation of electrodes E by screen printing on a green ceramic layer G which has been previously constructed by coating a green ceramic composition on one side of a carrier film F using a coater and dried in accordance with the conventional technology.

FIG. 3 is a schematic view showing the formation of electrodes E by screen printing on a green ceramic layer G which has been previously constructed by coating a green ceramic composition on one side of a carrier film F using a coater and dried in accordance with the conventional technology. In this case, the flatness of the surface carrying the electrodes E is impaired as steps are inevitably formed between the printed electrode pattern and the background.

Figure 4:
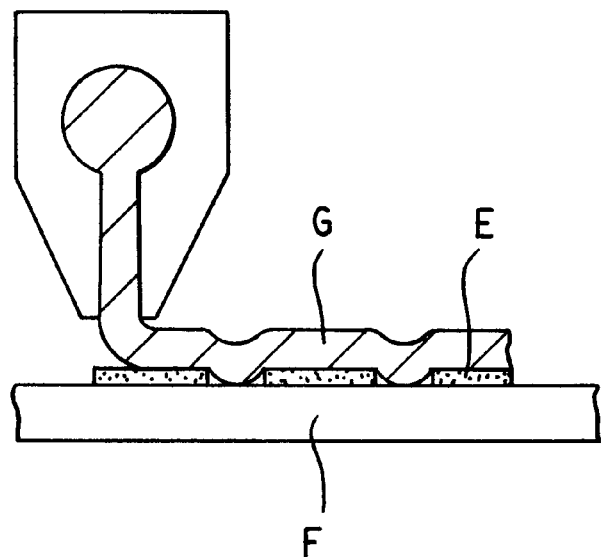
FIG. 4 is a schematic view showing the formation of a green ceramic layer G by coating a green ceramic composition using a coater after formation of electrodes E on one side of a carrier film F.

FIG. 4 is a schematic view showing the formation of a green ceramic layer G by coating a green ceramic composition using a coater after formation of electrodes E on one side of a carrier film F. In this coating procedure using a coater, partly due to insufficient bleeding of entrapped air, the green ceramic composition is not completely impregnated into the background regions other than the electrodes so that the formation of unfilled regions is inevitable. Moreover, the flatness of the upper surface of the ceramic sheet tends to be impaired as can be seen from FIG. 4.

Figure 5:
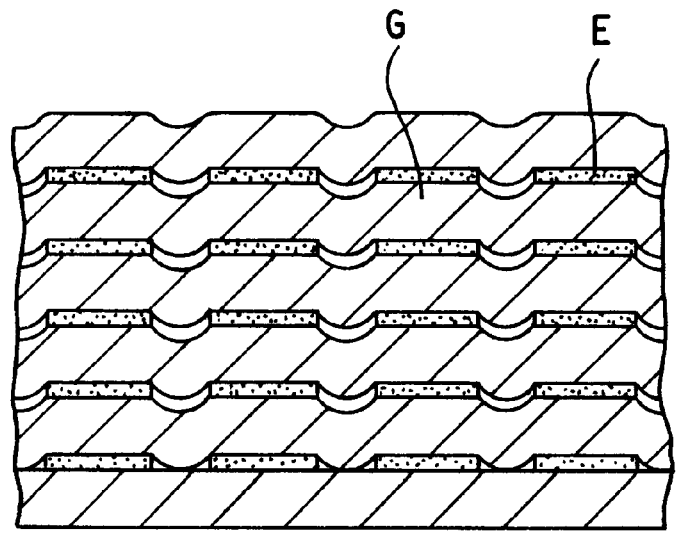
FIG. 5 is a cross-section view showing the laminate formed by serial lamination of a plurality of ceramic sheets prepared as illustrated in FIG. 3 or FIG. 4.

FIG. 5 is a cross-section view showing the laminate obtained by serial lamination of a plurality of ceramic sheets prepared as illustrated in FIG. 3 or FIG. 4. Since the ceramic sheet obtained by the conventional technology is poor in surface flatness, interlayer gaps are unavoidably formed as a plurality of such sheets are stacked and laminated. Therefore, special measures are required to eliminate gaps and even if such measures are taken, it is inevitable that rejects occur among the laminated ceramic electronic devices and complete reliability cannot be assured.

Some examples of production according to the present invention are now described in detail.

EXAMPLE 1

Figure 6:
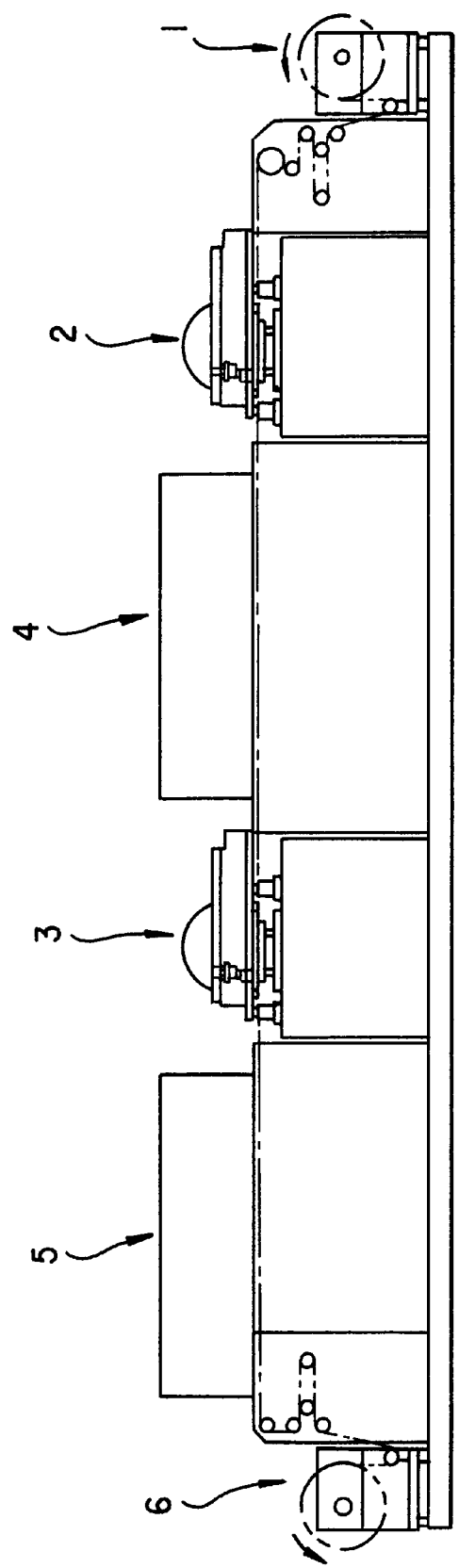
FIG. 6 is a front view of the printing machine used in accordance with the present invention, wherein the printing machine is a two-color takeup-type screen printing machine.

FIG. 6 is a front view of the printing machine used in accordance with the present invention, wherein the printing machine is a two-color takeup-type screen printing machine.

Referring to FIG. 6, the reference numeral 1 represents a payout unit, 2 a first color printing head, 3 a second color printing head, 4 a first color dryer head, 5 a second color dryer head, and 6 a takeup unit.

The carrier film F paid out from the payout unit 1 is screen-printed with a conductive composition according to an electrode pattern (inclusive of positioning marks and cutline marks) by the first color printing head 2 and then dried by the first color dryer head 4, whereby electrodes E are formed. Then, the film F carrying the printed electrode pattern is screen-printed in solid with the green ceramic composition by the second color printing head 3 and then dried by the second color dryer head 5, whereby a green ceramic layer G is formed. In this manner, a ceramic sheet carrying the carrier film F as illustrated in FIG. 7 is obtained in one operation.

Figure 7:
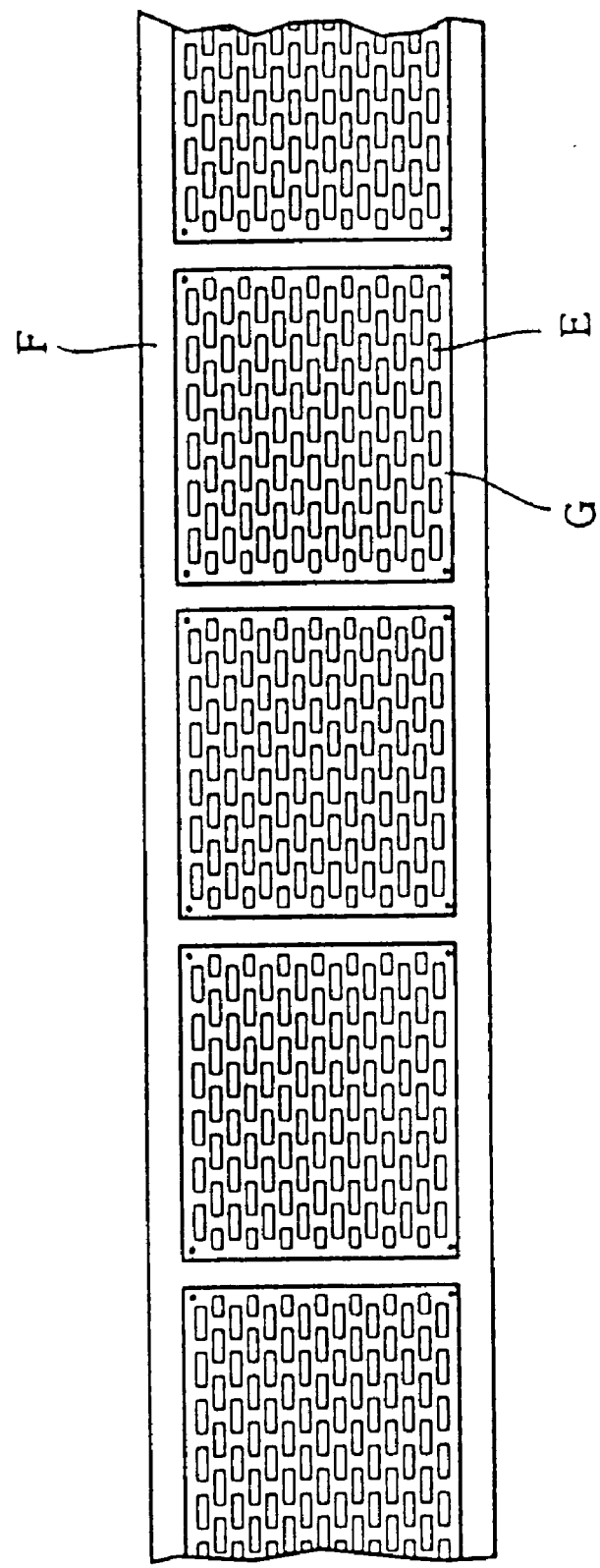
FIG. 7 is a plan view showing the ceramic sheet on carrier film F as obtained by screen-printing an electrode pattern on one side of carrier film F and then forming a green ceramic layer G thereon by means of the printing machine illustrated in FIG. 6.

FIG. 7 is a plan view showing the ceramic sheet formed on carrier film F as obtained by screen-printing an electrode pattern on one side of carrier film F and then forming a green ceramic layer G thereon by means of the printing machine illustrated in FIG. 6.

Figure 8:
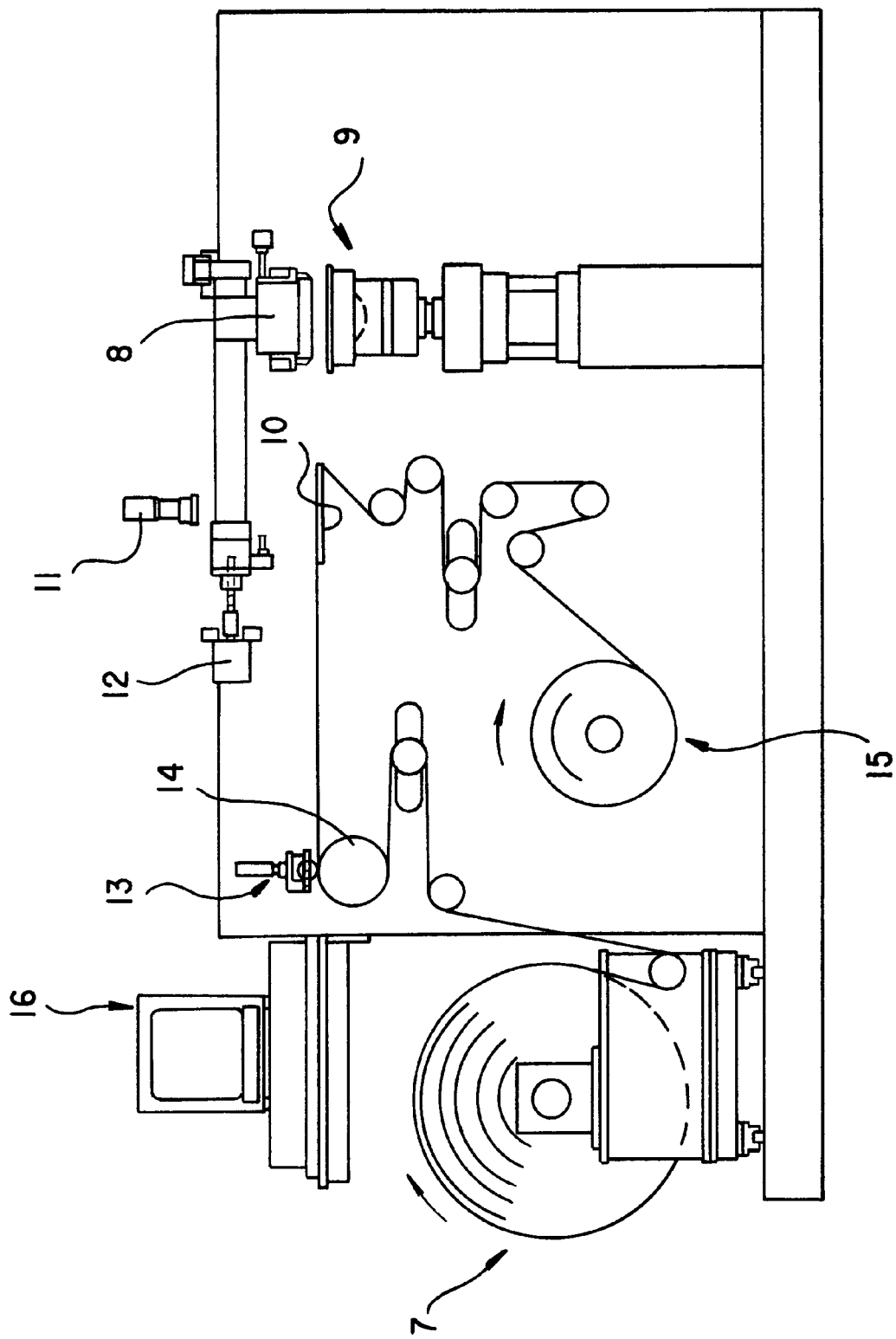
FIG. 8 is a front view showing an exemplary laminating machine which is used for releasing the ceramic sheet obtained by the method of the invention from the carrier film F and laminating a plurality of sheets into an integral laminate.

FIG. 8 is a front view showing an exemplary laminating machine which is used for releasing the ceramic sheet obtained by the method of the invention from the carrier film F and laminating a plurality of sheets into an integral laminate.

Referring to FIG. 8, the reference numeral 7 represents a payout unit, 8 a transfer unit, 9 a press table, 10 a releasing table, 11 a CCD camera, 12 a driving motor, 13 a longitudinal cutter, 14 a suction roll, 15 a takeup unit, and 16 a CCD monitor.

The ceramic sheet on carrier film F as shown in FIG. 7 is paid out from the payout unit 7, sucked up by the suction roll 14 and transported thereby. In the course of travel, the longitudinal cutter 13 disposed overhead said suction roll 14 trims (half-cuts) both edges of the ceramic sheet on carrier film F in a longitudinal direction (the direction of advance of the sheet) to a predetermined width. The ceramic sheet on carrier film F thus transported is positioned with respect to the electrode E pattern on the releasing table 10. The exact position of the pattern is detected by the CCD camera 11 and, based on the detection data, the transfer unit 8 is driven by the driving motor 12 to a position over the releasing table 10. The longitudinally cut ceramic sheet is cut (half-cut) on this releasing table 10 by the cutter means of the transfer unit 8 in a transverse direction to a predetermined length. The cut ceramic sheet is sucked up by the suction plate of the transfer unit 8. As the ceramic sheet is sucked up by the transfer unit 8, the releasing table 10 is shifted to the left in the view of FIG. 8 and the ceramic sheet sucked up by the suction plate of the transfer unit 8 is released from the carrier film F. The suction plate then ascends and the transfer unit 8 travels to a position over the press table 9. Then, the ceramic sheet is pressed against the carrier plate of the press table 9 as the press table ascends. Then, as the press table 9 begins to descend, the vacuum of the suction plate is relieved and air blows out to stack the ceramic sheet sucked to the suction plate on the carrier plate. Thereafter, the transfer unit 8 receives data on the exact position of the electrode E pattern set in position on said releasing table 10 from the CCD camera 11 and moves to that position. In this stage, a predetermined length according to the dimension of the printed pattern is added and subtracted with respect to the data received from the CCD camera 11 at every stacking of a layer and the sheet is accordingly cut, with the result that the ceramic sheets are laminated with their printed electrode patterns being alternately set in predetermined positions.

The above operation of stacking ceramic sheets one on another and laminating them is repeated. When a predetermined number of ceramic sheets has been laminated, a high pressure press compresses the whole stack into a film, integral artifact. After this integration, the procedure of cutting to individual chips, sintering, and installation of external electrodes, etc. are generally carried out on the part of the user of the device.

Using a paste-like ink consisting of a silver powder, a binder and a solvent as the conductive composition for construction of electrodes E, a green ceramic slurry composed predominantly of barium titanate as the green ceramic composition for the formation of green ceramic layer G, the screen printing and drying were carried out with the printing machine shown in FIG. 6 to obtain ceramic sheets each supported on a carrier film F shown in FIG. 7. Then, those sheets were laminated using the laminating machine shown in FIG. 8.

The size of each electrode E was set to 3.2 mm×0.8 mm and a plurality of electrodes E were laid out in staggered relation in 39 longitudinal rows and 111 horizontal rows on a square ceramic sheet cut to the size of 150 mm×150 mm. The dry thickness of the green ceramic layer G was set to 5 μm. The number of ceramic sheets after completion of the lamination series was 80 layers. The pressure applied for lamination of one sheet to another was set to 22 kg/cm² (5000 kg/(150 mm×150 mm)) and the final high-pressure lamination set pressure was 180 kg/cm².

In the screen printing and drying operation with the printing machine illustrated in FIG. 6, the regions other than the printed electrodes E are also completely filled up with the green ceramic composition so that the resultant green ceramic layer G contained no unfilled gaps. Moreover, the flatness of the resultant ceramic sheet was high on both sides. When the cross-section of the final laminate obtained by using the laminating machine shown in FIG. 8 was microscopically examined at 50×magnification, no interlayer gap was observed at all.

For reference, the lamination procedure using the lamination machine of FIG. 8 as described in Example 1 was repeated using the sheet shown in FIG. 3 (Comparative Example 1) and the sheet shown in FIG. 4 (Comparative Example 2) wherein the green ceramic layer G was constructed using a coater on a carrier film F according to the conventional processes. When the laminates obtained under the same pressure conditions as in Example 1 were microscopically examined (50×magnification), interlayer gaps were observed.

EXAMPLE 2

Figure 9:
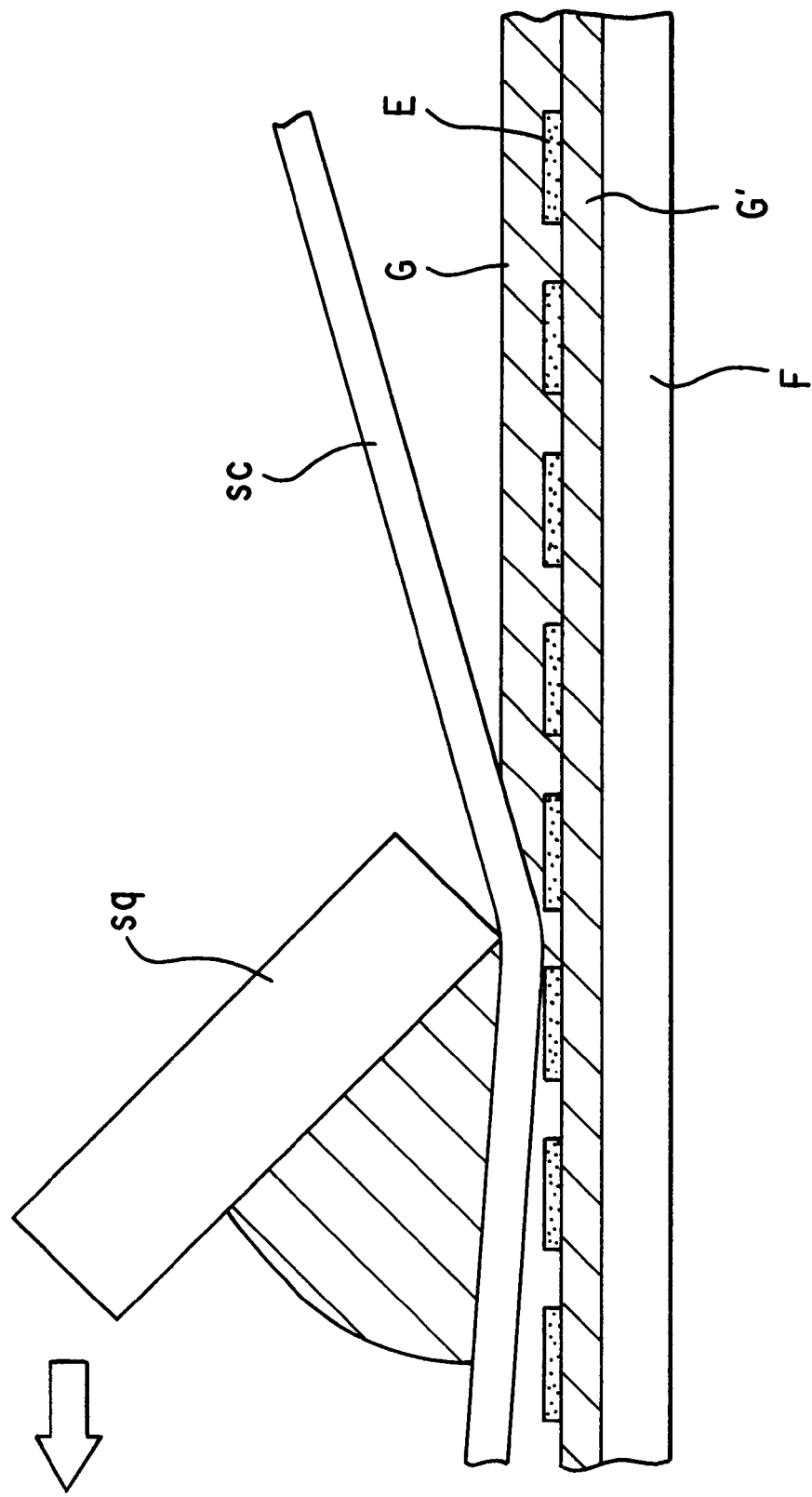
FIG. 9 is a schematic view showing the process of forming electrodes E on carrier film F through a green ceramic layer G' and, then, forming a green ceramic layer G.

FIG. 9 is a schematic view showing the process of forming electrodes E on carrier film F through a green ceramic layer G' and, then, forming a green ceramic layer G.

In this Example 2 where both the formation of electrodes E and that of the green ceramic layer G were carried out by the same screen printing technique, the green ceramic layer G' was first formed on the carrier film F by printing (or coating) and then the formation of the electrodes E and the formation of green ceramic layer G were carried out by the screen printing technique.

EFFECTS OF THE INVENTION

In the ceramic sheet produced by the method of the invention, the regions other than the printed electrodes E have also been completely filled with a green ceramic composition to provide a void-free green ceramic layer G. Moreover, the flatness of both sides of the ceramic sheet is high regardless of its thickness. Such ceramic sheets can be laminated uniformly without leaving gaps between layers and the final laminate obtained by high pressure is also free from interlayer gaps. Therefore, as the laminate is sintered and fabricated into a final laminated ceramic electronic device, the incidence of rejects is minimal or nil. In addition, since the green ceramic layer G is formed with just the very printing machine used for printing electrodes E, the coater equipment and process can be omitted so that the production cost is positively reduced.

What is claimed is:

1. A method of producing a laminated ceramic capacitor, said method comprising the steps of:

(a) screen-printing on one side of a carrier film, paid out from a payout unit, an electrically conductive composition either directly or through a green ceramic layer imagewise to form electrodes;

(b) screen-printing a green ceramic composition, on said electrodes thereby forming a ceramic sheet;

(c) cutting said ceramic sheet on said carrier film into unit ceramic sheets;

(d) stacking said unit ceramic sheets;

(e) laminating said unit ceramic sheets by pressing at a first pressure to obtain a laminate made up of a predetermined number of said unit ceramic sheets;

(f) pressing said laminate at a second pressure higher than said first pressure to obtain a highly integral laminate;

(g) cutting said highly integral laminate into individual chips;

(h) sintering said individual chips; and (i) providing end faces of said individual chips with external electrodes.

2. The method of claim 1, wherein a dummy ceramic sheet not printed with electrodes is laminated as at least one of a first layer, a last layer, and an intermediate layer.

* * * * *